T. Wright,
Rotary Steam Engine.
Nº 4,182.  Patented Sep. 9, 1845.
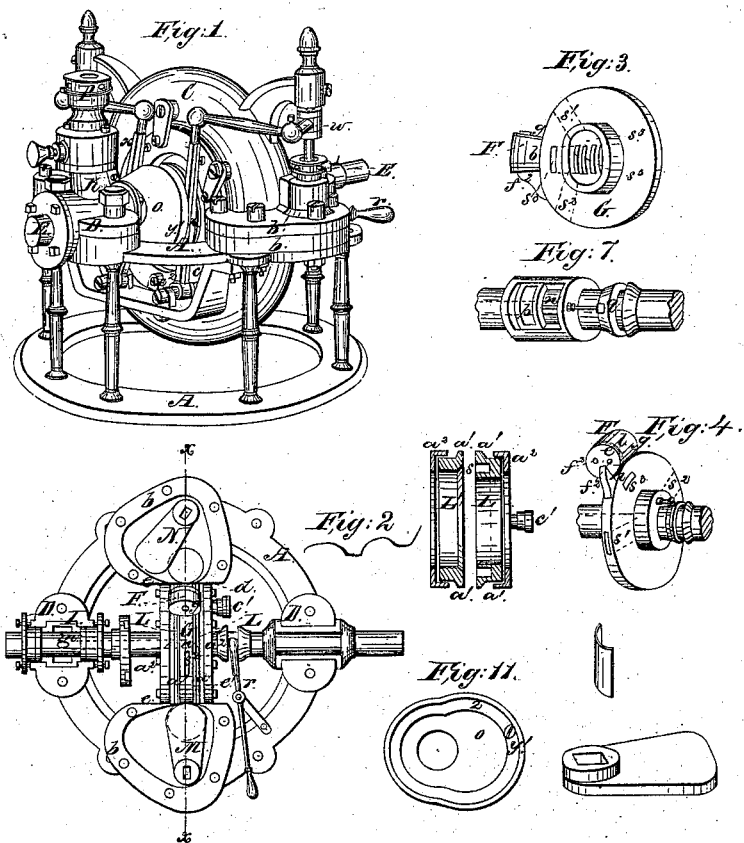

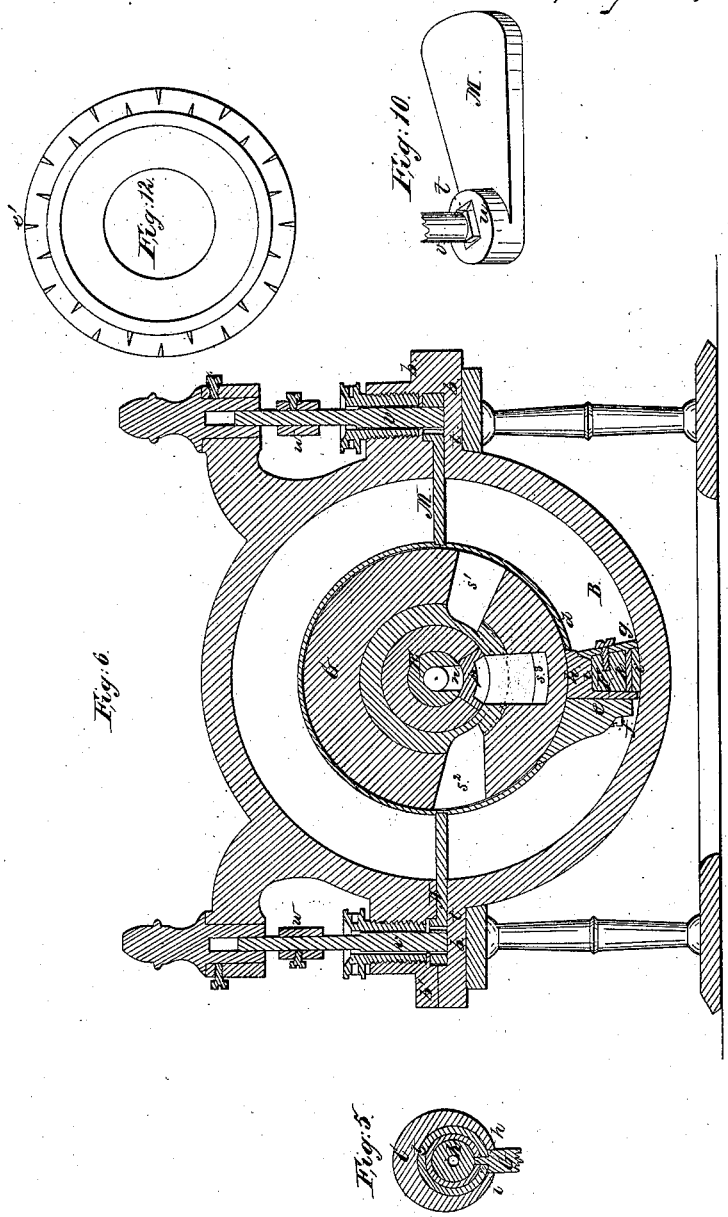
W. Wright,
Rotary Steam Engine.
N°4,182.   Patented Sep. 9, 1845.

UNITED STATES PATENT OFFICE.

WILLIAM WRIGHT, OF PROVIDENCE, RHODE ISLAND.

ROTARY ENGINE.

Specification of Letters Patent No. 4,182, dated September 9, 1845.

*To all whom it may concern:*

Be it known that I, WILLIAM WRIGHT, formerly of Rochester, Monroe county, New York, and now of Providence, Rhode Island, have invented certain new and useful Improvements in Rotary Steam-Engines, and that the following is a full, clear, and exact description of the principle and character thereof and of the manner of constructing and using the same, reference being had to the accompanying drawings, which make part of the same, in which—

Figure 1, is a perspective view of the entire engine; Fig. 2, a top view, with the upper half removed to exhibit more fully the internal arrangement; Figs. 3, and 4, perspective views of the piston with the disk to which it is attached, and which connects it with the shaft, and exhibiting the steam and exhaust passages; the other figures represent separate parts in section, and will be referred to in their appropriate places.

The same parts are indicated by the same letters in all the figures in which they appear.

The characteristics of this engine, and what distinguishes it from all others before known, are first, making the annular chamber in which the piston works (technically termed the "cylinder") in two parts, united at a line passing through the center of the annular chamber, and parallel with the axis of the shaft, instead of uniting the two halves, at a line at right angles to the axis, by which arrangement I am enabled to make the cylinder true, less liable to unequal expansion, avoiding the necessity of a continuous packed, or ground joint, entirely around the chamber or cylinder, and presenting the important advantages of greater solidity and simplicity, the lower half being permanently fixed in the frame, which supports the bearings of the shaft, &c., by flanches which admit the induction and eduction valves; thus greatly reducing the number of packed or ground joints, so objectionable in all steam engines, particularly the rotary engines. This arrangement not only adds greatly to the strength of the whole structure, but enables me to bore out the cylinder by an instrument, which, during the operation, has its bearings in the boxes, intended for the shaft of the piston, to insure accuracy in all the parts. Secondly, in so arranging the steam and exhaust valves, and the steam passages in the disk to which the piston is attached, as to avoid the pressure of steam on the valves, when moving; and connecting these with a shifting valve, which governs the apertures in the disk and the one on the hollow shaft, through which the steam is admitted, and an annular groove in one of the packing plates, that covers the disk so as to afford an easy and simple mode of reversing the action of the engine. Thirdly, in grooving the faces of the disk, and of the packing plates, or cheeks, between which it works, from the outer periphery inward, to admit steam to lubricate the rubbing surfaces. Fourthly, making the outer and rubbing surfaces of the piston, of a single, spring metal hoop, divided at its junction with the disk, so that by means of hempen or other packing within, and a packing head, the diameter of this ring can be enlarged and diminished at pleasure to fit the cylinder, by which means the numerous joints found in metal pistons heretofore used, and which are so objectionable, are avoided. And, lastly, connecting the piston to a flanch projecting from a disk on the shaft, by means of screws passing through enlarged apertures in the disk, to admit of the free play of the piston, to adapt itself to the cylinder in case of any inaccuracy.

In the accompanying drawings A, is the frame work adapted to the reception of the various parts of the engine; and to the upper plate of it, is bolted the lower half B, of the cylinder, by means of the flanches $(b, b,)$ and then to these flanches are secured by appropriate bolts, the upper half C, of the cylinder by means of the flanches $(b^1, b^1,)$, so that the only fitting is at this junction of the two halves.

The method which I have adopted of making the cylinder with the view of securing these advantages, is to place the boring instruments in the boxes D, D, in which the shaft E, of the piston is intended to work. The inner periphery of the annulus, in which the cylinder is to be formed, is bored out cylindrically, then the slot $(d)$ is cut out by means of an appropriate tool, which, as it rotates, is forced out from the center of motion, and then the cylinder is bored out by means of a cutting tool, so connected with its stock, or a flanch projecting from its shaft supported as above stated, as to rotate about a cutter corresponding with the center of the bore. The instrument which I employ in this operation I intend securing by Letters Patent, the application for which will be filed simultaneously with this. It will be evident that this mode of procedure secures accuracy in all the parts. The piston F, is secured to a flanch ($e$,) projecting from a disk or drum G, connected with the shaft E, by means of screws ($f$, $f$,) Fig. 4, that pass through holes in the flanch sufficiently large to give a slight play to the piston, that it may adapt itself in rotating to any unequal expansion or any inaccuracy arising from any other cause. The peculiarity of the construction of this piston is represented in Figs. 5, and 6, the former giving an end view with the head ($g$,) removed, and the latter a longitudinal section passing through the center. The back plate which forms the connection with the flanch by means of the screws ($f$, $f$,) has a projection ($h$,) which rests on the periphery of the disk or drum, and a fillet ($i$,) that extends from this projection to the body ($k$,) of the piston, over which passes the metallic packing ($l$,) which is a spring hoop, divided at that part which receives the fillet ($i$,), so that by the introduction of hempen or other packing between the ring and body of the piston, and screwing on the head ($g$,) the spring hoop is enlarged to fit the cylinder, and at the same time the joints around the fillet are rendered steam tight. This mode of construction not only insures accuracy of fit, but presents the entire rubbing surface of the piston, without joints, which are so objectionable, particularly in rotary engines, in which the piston is required to pass the junction of the valves. The base of the flanch ($e$,), or that part which lies between the piston and the circumference of the disk or drum, is made to fit the slot ($d$) accurately, and the said disk G, is in thickness equal to the width of this slot.

The steam is admitted through the shaft, which is tubular for that purpose, from ($m$,) to ($n$,) as represented by dotted lines in Fig. 2. It is pierced at ($m$,) and ($n$,) the aperture ($m$,) opening into a groove ($o$,) in the box I, which receives one of the journals of the shaft, (the steam pipe K, see Fig. 1, being connected with this box, which is provided with a valve in the usual way for shutting off the steam and with stuffing boxes to prevent the escape of steam, the construction of which, being well known, needs no description,) and at ($n$,) to communicate with the steam passages in the disk. That part of the shaft in which the aperture ($n$,) is made is of greater diameter than the other parts; it is made cylindrical to fit in the hub of the disk, and there keyed in the usual manner. This part of the shaft is represented in section at Fig. 7. It is cut in, immediately around the aperture ($n$,), for the reception of a sliding valve ($p$), connected by means of rods with a sliding collar ($q$), on a shaft, grooved to receive the forked end of a lever ($r$) jointed to the frame by which the valve can be shifted when it is desired to reverse the action of the engine, the operation of this part of the engine will be clearly understood, by reference to section Fig. 3, where the steam and exhaust passages are represented at ($s^1$, $s^2$, $s^3$), ($s^1$) being the steam passage, which conducts the steam, (as shown by dotted lines) forward of the piston, ($s^2$) back of the piston, and ($s^3$,) is the exhaust passage, extending from the inside of the hub, to the side of the disk, where it opens into an annular groove ($s^4$) in a packing plate L, which fits against the face of the disk, in a manner to be hereafter described. These steam passages in the hub are governed by the valve ($p$,), which, when in the position represented in the drawing, leaves the steam passage ($s^1$) in connection with the steam pipe, the other steam passage and the exhaust passage in communication by the cup of the valve; but when the valve is shifted, these communications are reversed, and of couse the action of the engine also. The aperture ($n$,) in the shaft, must be of sufficient length to open the communication, at either end of the valve when shifted.

It will be perceived that the steam passages or ports pass through the periphery of the disk. The length being much greater than the width, and in the direction of the circumference of the disk. The length of these apertures must be such, as, when passing the steam and exhaust valves, to open into the cylinder above and below them (say about six times as great, as the thickness of the valves,) and their position on the periphery is such, with reference to the periods of the openings of the valves, as that the valve shall have all its motion with an equal or nearly equal pressure above and below, thus avoiding the great loss of power by friction. In Fig. 6, which is a sectional elevation of the engine, taken at the line ($x$, $x$,) of Fig. 2, the position of the apertures and the valves is fully represented, with the view to illustrate this important arrangement and effect. The valves M, and N, are supposed to be shut, and the steam passing in through the passage ($s^1$,) acts between the piston and valve M; the cylinder between the piston and valve N, being exhausted, and the upper half of the cylinder filled with the steam that impelled the piston before the valve M, was closed; at this stage of the operation, it becomes necessary to open the valve N, which having a vacuum below, and the pressure of steam above, it becomes necessary to avoid the pressure, to establish an equilibrium before the valve begins to move, which is effected the moment the steam passage ($s^2$,) begins to pass above the valve N, which establishes the communication between the parts of the cylinder above and below the valve, and the exhaust passage, thus equalizing the pressure, and then the valve begins to move, and is completely opened by a quarter revolution of the piston without pressure. As soon as the piston has passed the valve N, the valve begins to shut, its motion being through a column of steam, and therefore in equilibrio; the closing is completed the moment that the lower edge of the steam aperture, or passage ($s^1$,) passes above the lower edge of the valve.

The valve seats are made in the flanches ($b$ $b^1$) which connect the lower half B, of the cylinder to the frame, these flanches being excavated to a sufficient depth to receive and admit of the free play of the valves M, and N. The forward ends of these valves are made to fit close against the periphery of the disk, and are pressed up against it by a spring ($t$) (see Fig. 10 which represents the valve on its rod), which lies in the mortise ($u$) of the valve, which receives the stem ($v$) by which the valve is operated.

The stems ($v$ $v$) of these two valves pass through stuffing boxes, and are supported at the upper end by braces cast with ends projecting from the upper half of the cylinder, and are each provided with an arm ($w$ $w$) connected by a rod with the end of a lever ($x$ $x$), Fig. 1, jointed to the frame at ($y$ $y$) and provided with a roller ($y^1$) that plays in a cam groove ($z$) (see Fig. 11) in a plate O attached to the shaft. The form of the cam groove ($z$) is represented in section at Fig. 11 and it must be observed that this form of cam groove depends on the location and size of the steam passages and the periods of motion of the valves; but governed by the principle or character herein fully expressed.

The junction of the disk with the cylinder is packed by means of packing plates L L$^1$, Fig. 2, ground to the faces of the disk, and their outer periphery accurately fitted to the inner face of the cylinder. The circumference of these plates is adapted to the reception of hempen or other packing ($a^1$ $a^1$) and packing rings ($a^2$ $a^2$). One of these packing plates is provided with an annular groove ($s^4$) corresponding with the exhaust passage that passes through the face of the disk, and this groove is in communication with the exhaust pipe ($c^1$). The packing plates are kept up to the faces of the disk by means of screw dogs ($c^2$ $c^2$) attached to the cylinder in a manner clearly indicated in the drawings, and provided with screws to force the packing plates up to the disk.

The faces of the packing plates and the disk that come together are grooved from the outer periphery inward, as represented in the drawings at ($e^1$), Fig. 12, for the purpose of admitting steam to lubricate the rubbing surfaces; it should be observed that these lubricating grooves extend on the side of the exhaust groove, nearly to it, and on the outer side nearly to the inner periphery; the openings of these grooves are also shown in Fig. 2 at ($e^1$).

The grooved bore (I, Fig. 2) in which works the journal of the shaft, having the aperture ($m$), may be provided with a cut-off valve made and operated in accordance with any of the known plans.

The arrangement of valve stems, levers, and connecting rods may be varied at the discretion of the constructor, provided the periods of their motions in relation to the arrangement of the steam passage be substantially preserved.

Having thus described the chief characteristics of my engine, the manner of constructing, arranging and operating the parts, I wish it to be distinctly understood that I do not claim as my invention working the piston of a rotary engine in an annular groove or bent cylinder; nor do I claim admitting the steam through a hollow shaft and passages made in the disk to which the piston is attached, nor elastic metal ring packing; but

What I do claim, and desire to secure by Letters Patent, is—

1. Making the annular or bent cylinder in two parts divided by a plane, parallel with the shaft of the engine, instead of at right angles thereto, for the purpose and in the manner fully described.

2. The arrangement of the elongated steam and exhaust passages in the disk to which the piston is attached, when combined with the arrangement of the valves and the periods of their motions so as to cause them to establish an equilibrium (or nearly so) of the pressure above and below the valves prior to and during their motions, substantially as described.

3. The arrangement of the steam and exhaust passages in the disk in combination with the shifting valve governing the aperture in the tubular shaft, and the annular groove in the packing plate for the purpose and in the manner described.

4. Grooving the faces of the disk and packing plates to admit steam to the rubbing surfaces for the purpose of lubricating them, as described.

5. Making the outer or rubbing surface of the piston of a single open spring metallic hoop in combination with the hempen or other packing within, and the mode of retaining the hoop by fitting it over the fillet projecting from the flanch that forms the connection with the disk, which junction is rendered steam tight by means of the inner packing, as described.

6. And lastly connecting the piston to a flanch projecting from the disk on the shaft by means of screws passing through the enlarged apertures in the flanch to admit of the free play of the piston to adapt itself to the cylinder in case of inaccuracy, as described.

WILLIAM WRIGHT.

Witnesses:
 FREDK. S. CHURCH,
 W. W. UPDIKE.